(12) United States Patent
Baumert et al.

(10) Patent No.: US 9,637,090 B2
(45) Date of Patent: May 2, 2017

(54) WIPER DEVICE

(75) Inventors: Stefan Baumert, Karlsruhe (DE);
Andreas Pichler, Bruchsal (DE); Mike Obert, Gernsbach (DE); Andreas Benner, Taipei (TW)

(73) Assignee: Robert Bosch GmbH, Stuttgart (DE)

( * ) Notice: Subject to any disclaimer, the term of this patent is extended or adjusted under 35 U.S.C. 154(b) by 487 days.

(21) Appl. No.: 14/233,907

(22) PCT Filed: Jul. 6, 2012

(86) PCT No.: PCT/EP2012/063292
§ 371 (c)(1),
(2), (4) Date: Jan. 21, 2014

(87) PCT Pub. No.: WO2013/010825
PCT Pub. Date: Jan. 24, 2013

(65) Prior Publication Data
US 2014/0143970 A1 May 29, 2014

(30) Foreign Application Priority Data
Jul. 21, 2011 (DE) .................. 10 2011 079 530

(51) Int. Cl.
*B60S 1/40* (2006.01)
*B60S 1/38* (2006.01)

(52) U.S. Cl.
CPC ............ B60S 1/40 (2013.01); B60S 1/3853 (2013.01); *B60S 1/381* (2013.01); *B60S 1/387* (2013.01); *B60S 1/3858* (2013.01)

(58) Field of Classification Search
CPC ........ B60S 1/3858; B60S 1/381; B60S 1/387; B60S 1/3879; B60S 1/3886
(Continued)

(56) References Cited

U.S. PATENT DOCUMENTS 5,077,860 A * 1/1992 Charng ............... B60S 1/3801
15/250.31
7,350,259 B2 * 4/2008 Walworth ............ B60S 1/3856
15/250.201
(Continued)

FOREIGN PATENT DOCUMENTS

CN 101506011 A 8/2009
DE 19645170 5/1998
(Continued)

OTHER PUBLICATIONS

International Search Report for Application No. PCT/EP2012/063292 dated Oct. 8, 2012 (3 pages).

*Primary Examiner* — Michael Jennings
(74) *Attorney, Agent, or Firm* — Michael Best & Friedrich LLP

(57) ABSTRACT

The invention relates to wiper device, comprising an adapter (10a; 10b; 10c; 10d; 10e; 10f; 10g; 10h), which forms a point of articulation to a wiper arm or a wiper blade (12a; 12e; 12h) and has at least one form-closure element (16a, 18a; 16b, 18b; 16c, 18c; 16d, 18d; 16e, 18e; 16f, 18f; 16g, 18g; 16h, 18h) for translational assembly with an additional adapter (14a; 14b; 14c; 14d; 14e; 14f; 14g; 14h) in an axial direction, the at least one form-closure element being provided for the form-closed connection to at least one form-closure element (20a, 22a; 20b, 22b; 20c, 22c; 20d, 22d; 20e, 22e; 20f, 22f; 20g, 22g; 20h, 22h) of the one additional adapter (14a; 14b; 14c; 14d; 14e; 14f; 14g; 14h) in the axial direction. According to the invention, the wiper device has at least one actuating element (24a, 26a; 24b, 26b; 24c, 26c; 24d, 26d; 24e, 26e; 24f, 26f; 24g, 26g; 24h, 26h), which is designed to be deflected in order to deflect the at least one (Continued)

form-closure element (20*a*, 22*a*; 20*b*, 22*b*; 20*c*, 22*c*; 20*d*, 22*d*; 20*e*, 22*e*; 20*f*, 22*f*; 20*g*, 22*g*; 20*h*, 22*h*) during disassembly.

22 Claims, 9 Drawing Sheets

(58) Field of Classification Search
USPC .......................................... 15/250.31, 250.32
See application file for complete search history.

(56) References Cited

U.S. PATENT DOCUMENTS

| | | | |
|---|---|---|---|
| 7,587,783 B1 * | 9/2009 | Lin ..................... | B60S 1/3858 |
| | | | 15/250.201 |
| 2009/0199357 A1 | 8/2009 | Thienard | |
| 2010/0186185 A1 * | 7/2010 | Grasso ................. | B60S 1/387 |
| | | | 15/250.32 |

FOREIGN PATENT DOCUMENTS

| | | | | |
|---|---|---|---|---|
| DE | 102006047633 | | 4/2008 | |
| DE | 102009014700 | | 10/2009 | |
| DE | 102009000860 | | 8/2010 | |
| FR | 2916715 | A1 * | 12/2008 | ............. B60S 1/387 |
| FR | WO 2008145481 | A1 * | 12/2008 | ............. B60S 1/387 |

* cited by examiner

WIPER DEVICE

BACKGROUND OF THE INVENTION

A wiper device has already been proposed with an adapter which forms a hinge point to a wiper arm and has at least one form-fit element which is provided for translational mounting in an axial direction with a further adapter and for form-fit connection in the axial direction with at least one form-fit element of the one further adapter.

SUMMARY OF THE INVENTION

The invention is based on a wiper device with an adapter which has a pivot point to a wiper arm or a wiper blade and has at least one form-fit element which is provided for translational mounting in an axial direction with a further adapter and for form-fit connection in the axial direction with at least one form-fit element of the one further adapter.

It is proposed that the wiper device has at least one actuating element which is provided to be deflected manually in order to deflect the at least one form-fit element on dismantling. Thus mounting, and in particular dismantling, is made particularly simple and intuitive for a user. The term "adapter" means in particular a wiper arm adapter or a wiper blade adapter. A "wiper arm adapter" in this context means in particular an adapter which has a contact area to a wiper arm component and is provided to create a coupling region of the wiper arm component for coupling and/or contacting with a wiper blade adapter. Preferably the wiper arm component can be attached to a wiper arm. A "wiper blade adapter" in this context means in particular an adapter which has a contact area to a wiper blade component and is captively connected, at least in an operating state, with a wiper blade component when a wiper blade is in a state dismantled from a wiper arm, and is provided to create a coupling area of the wiper blade component for coupling and/or contacting with a wiper arm adapter. "Translational mounting" here means in particular mounting in which two components, in particular the two adapters, are moved towards each other in a rectilinear motion and are joined together, whereby particularly advantageously the motion is exclusively rectilinear. A "form-fit connection in the axial direction" means in particular that the connection only has a form fit in the axial direction, and the form-fit connection can transmit a force mainly—particularly advantageously, exclusively—in the axial direction. The term "provided" means in particular specially designed and/or equipped. An "actuating element" is in particular an element which is provided for actuation, in particular for pressure actuation, by the user and for this in particular has a special marking and/or shaping. The term "deflect" here means in particular that the form-fit element is bent out of an original state which it assumes without the effect of external forces.

Furthermore it is proposed that the at least one actuating element is formed as a manual actuating element and is provided to be deflected manually. Thus the user can deflect the form-fit element particularly easily and intuitively by means of the at least one actuating element. The term "deflect manually" means in particular deflection by the user by hand, without tools.

Furthermore it is proposed that the adapter is formed as a wiper arm adapter. Thus the form-fit connection between the adapter formed as the wiper arm adapter and the further adapter can be structured particularly advantageously.

It is furthermore proposed that the axial direction runs parallel to a vertical axis. Thus the at least one form-fit element formed as a catch element can be designed particularly advantageously, since extremely low forces have to be transmitted along the vertical axis. The term "vertical axis" in this context means in particular an axis which is arranged perpendicular to a support surface of the wiper blade adapter. The "support surface" in this context is in particular a flat surface on which the wiper arm adapter is placed during a mounting process and/or which is provided to transmit a main contact force of the wiper arm adapter to the wiper blade adapter. A "main contact force" in this connection means in particular a force which presses the wiper blade adapter and/or a wiper blade in the direction of a surface to be wiped, such as in particular a motor vehicle pane.

Furthermore it is proposed that the at least one form-fit element is arranged on an outside of the adapter. Thus the at least one form-fit element can be deflected by the user particularly advantageously and easily.

The term "outside of the adapter" means in particular an outside which terminates the base body of the adapter towards the outside.

Furthermore it is proposed that the form-fit element of the adapter is formed as a catch element which is provided to be deflected during mounting. Thus the adapters can be joined together particularly easily in the axial direction. The term "catch element" in this context means in particular an element which is provided to create an engagement connection and to be deflected elastically on mounting and engage in a form-fit connection under a spring effect, wherein the spring effect can in principle be achieved by a separate spring but the element is preferably formed as a spring-elastic element in order to generate the spring effect.

Furthermore it is proposed that the at least one form-fit element formed as a catch element has a deflection direction which is oriented at least substantially in an actuation direction of the at least one actuating element.

Thus the form-fit element can be deflected particularly easily by means of the actuating element. The term "deflection direction of the form-fit element" means in particular a direction in which the form-fit element must be deflected in order to release a form-fit connection with the corresponding form-fit element. An "actuation direction" means in particular a direction in which the at least one actuating element is deflected by the user in order to deflect the at least one form-fit element. The term "at least substantially in the actuation direction" in this context means in particular that between the actuation direction and the deflection direction, there is a deviation of less than 22°, preferably less than 30° and particularly preferably less than 10°.

It is also proposed that the at least one form-fit element formed as a catch element has a deflection direction which is oriented at least substantially opposite the actuation direction of the at least one actuating element. Thus a force which the user must exert on the actuating element in order to deflect the form-fit element can be set particularly advantageously. The term "oriented at least substantially opposite the actuation direction" means in particular that between the deflection direction and an anti-coaxial of the actuation direction, there is a deviation of less than 22°, preferably less than 30° and particular preferably less than 10°. The term "anti-coaxial of the actuation direction" means in particular a direction which stands at an angle of precisely 180° to the actuation direction.

Furthermore it is proposed that the adapter has at least one further form-fit element which is provided for form-fit connection with the further adapter in order to prevent a rotation of the adapters in relation to each other. Thus a force transmission between the adapters can be structured particularly advantageously.

Also a system with the wiper device and the further adapter is proposed, wherein the further adapter is formed as a wiper blade adapter. Thus a particularly advantageous and stable connection to a wiper blade can be achieved.

Furthermore a system with a wiper device is proposed wherein the further adapter is formed as a spring rail. Thus a particularly compact connection to the wiper blade can be achieved.

BRIEF DESCRIPTION OF THE DRAWINGS

Further advantages arise from the description of the drawings below. The drawings show eight exemplary embodiments of the invention. The drawing, the description and the claims contain numerous features in combination. The person skilled in the art will suitably also consider the features individually and combine these into suitable further combinations.

The drawings show.

DETAILED DESCRIPTION

Figure 1:
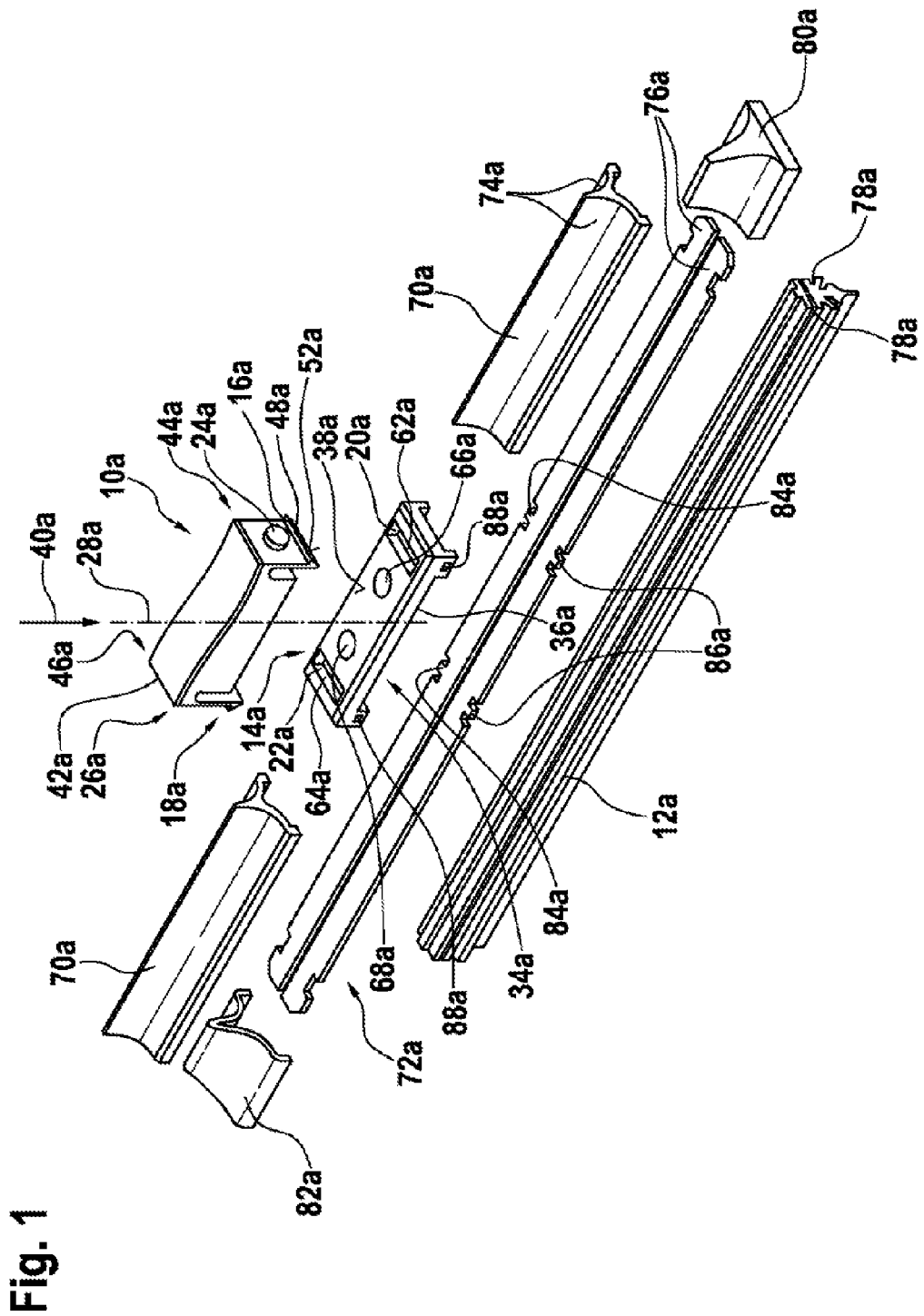
FIG. 1 an exploded view of a system according to the invention with a wiper device in a first exemplary embodiment.
Figure 2:
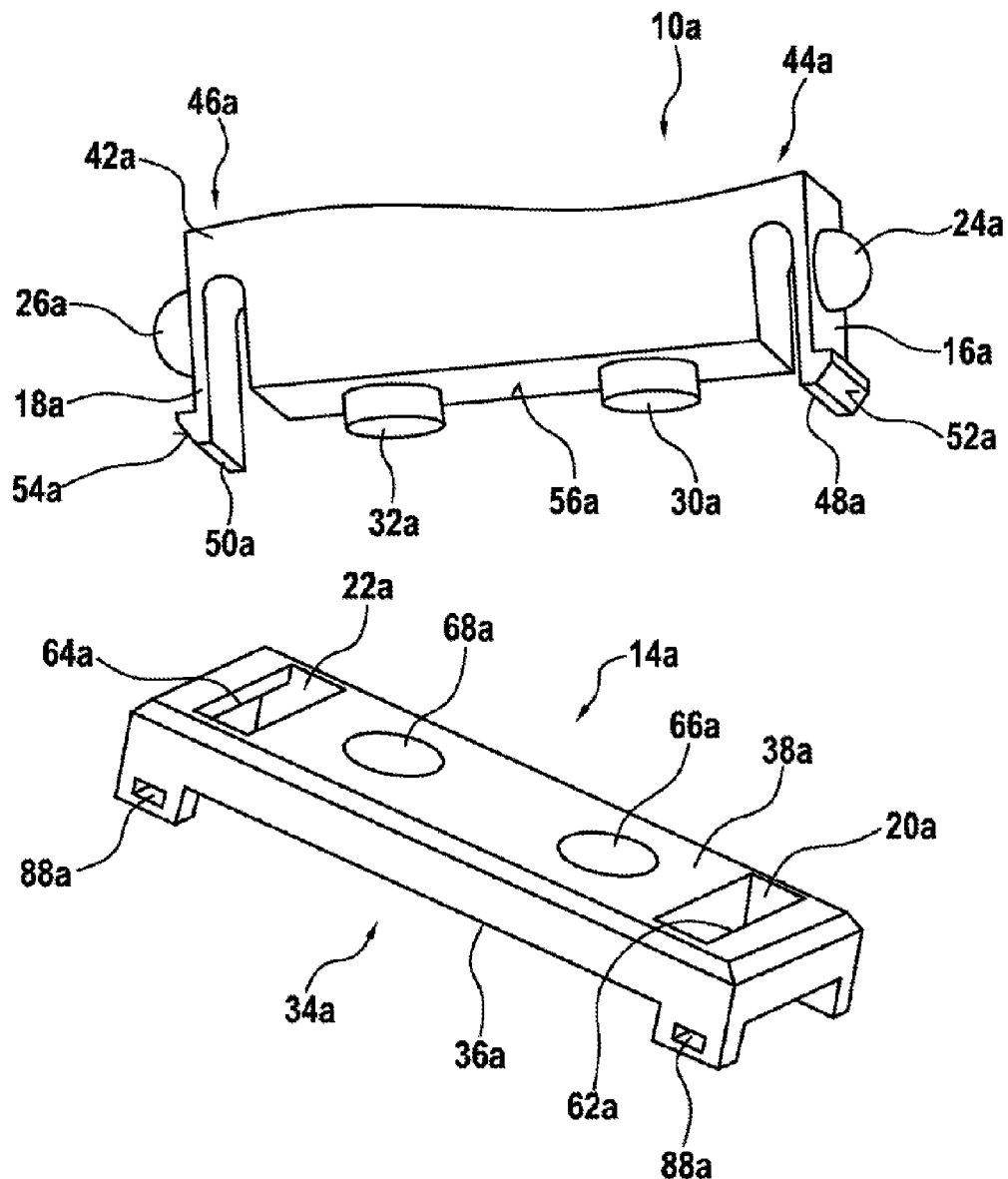
FIG. 2 a perspective view of the system with the wiper device according to FIG. 1.

FIG. 1 and FIG. 2 show a system according to the invention with a wiper device of a motor vehicle in a first exemplary embodiment. The wiper device has an adapter $10a$ which has a pivot point (not shown in more detail) to a wiper arm. The adapter $10a$ which has the pivot point to the wiper arm is formed as a wiper arm adapter. The adapter $10a$ formed as the wiper arm adapter must be changed depending on the design of the wiper arm. Embodiments of said pivot point of adapter $10a$ are generally known to the person skilled in the art and are not shown for reasons of clarity.

Furthermore the system comprises a further adapter $14a$ and a wiper arm blade $12a$. The further adapter $14a$ has a pivot point $34a$ for the wiper blade $12a$. The further adapter $14a$ which has the pivot point for the wiper blade $12a$ is formed as a wiper blade adapter. The adapter $10a$, formed as the wiper arm adapter, is formed detachably from the further adapter $14a$, formed as the wiper blade arm adapter, and therefore exchangeably.

The further adapter $14a$ formed as a wiper blade adapter has a base body $36a$. Furthermore the base body $36a$ is formed from a plastic injection molding. In this context it is also conceivable to form the base body $36a$ from a metal part, such as in particular a metal sheet, or another material which appears suitable to the person skilled in the art. The base body $36a$ has a flat support surface $38a$. During a mounting process, the support surface $38a$ serves as a support for the adapter $10a$ formed as the wiper arm adapter. The adapter $10a$ is placed on the support surface $38a$ during the mounting process. A vertical axis $28a$ is arranged perpendicular to the support surface $38a$ of the adapter $14a$ formed as the wiper blade adapter. The vertical axis $28a$ is also arranged parallel to a main contact force $40a$ of the adapter $10a$ formed as the wiper arm adapter. The main contact force $40a$ is generated by a torque acting on the wiper arm, and presses the further adapter $14a$ formed as a wiper blade adapter, and the wiper blade $12a$ which is connected hingelessly to the further adapter $14a$, in the direction of a motor vehicle pane to be wiped (not shown in more detail). A horizontal axis is arranged parallel to the main extension direction of the wiper blade $12a$.

The adapter $10a$ is provided for translational mounting in an axial direction with the further adapter $14a$. The axial direction runs parallel to the vertical axis $28a$. The adapter $10a$ has base body $42a$ which comprises a form-fit element $16a$, $18a$ on each of two opposing sides. The two form-fit elements $16a$, $18a$ are provided for form-fit connection of the adapter $10a$ in the axial direction. The form-fit elements $16a$, $18a$ are arranged on an outside $44a$, $46a$ of the adapter $10a$ and delimit the adapter $10a$ at an end of the adapter $10a$ oriented orthogonal to the horizontal axis. The form-fit elements $16a$, $18a$ are formed integrally with the base body $42a$ of the adapter $10$. The form-fit elements $16a$, $18a$ are connected to the base body $42a$ in an outer region of the adapter $10a$ facing away from the further adapter $14a$ in mounted state. The form-fit elements $16a$, $18a$ of the adapter $10a$ are formed as catch elements. They are deflected in a deflection direction on assembly with the further adapter $14a$. The deflection direction is here oriented at least substantially parallel to the horizontal axis. The form-fit elements $16a$, $18a$ formed as catch elements are oblong and have a hook form $48a$, $50a$ on their side facing the further adapter $14a$ in mounted state. The hook forms $48a$, $50a$ are here directed outward i.e. away from the centre plane of the adapter $10a$. On their underside, the hook forms $48a$, $50a$ each form a deflection chamfer $52a$, $54a$ which is provided to deflect the corresponding form-fit element $16a$, $18a$ by contact with the further adapter $14a$ during the mounting process. The deflection chamfers $52a$, $54a$ are also directed away from the centre plane of the adapter so that the form-fit elements $16a$, $18a$ can be deflected inwards by means of the deflection chamfers $52a$, $54a$ during mounting, in the direction of the centre plane of the adapter $10a$.

The wiper device comprises two actuating elements $24a$, $26a$ which are provided to deflect the form-fit elements $16a$, $18a$ of the adapter $10a$ on dismantling. Here the actuating elements $24a$, $26a$ are formed as manual actuating elements and are provided to be deflected manually by a user. The actuating elements $24a$, $26a$ are formed as protrusions on an outside of the form-fit elements $16a$, $18a$ facing away from the base body $42a$ of the adapter $10a$. The actuating elements $24a$, $26a$ are here formed integrally with the form-fit elements $16a$, $18a$. The actuating elements $24a$, $26a$ are made of the same material as the form-fit elements $16a$, $18a$. In principle however it is also conceivable that the actuating elements $24a$, $26a$ are made from another material, such as for example a rubber-like material or another material appearing suitable to the person skilled in the art. Here it is conceivable that the actuating elements $24a$, $26a$ are attached to the form-fit elements $16a$, $18a$ for example by an adhesive joint or another connecting method appearing suitable to the person skilled in the art. To identify the actuating elements 24a, 26a as actuating elements which can be actuated by the user, the actuating elements can have a specific shape or color which identifies these as such. For this the actuating elements 24a, 26a can for example have a marking which is formed by a signal color, or another feature appearing suitable to the person skilled in the art.

On dismantling, the form-fit elements 16a, 18a are deflected by means of the actuating elements 24a, 26a. A user, for example by his hand, exerts a deflection force on the form-fit elements 16a, 18a of the adapter 10 via the actuating elements 24a, 26a. The deflection direction of the form-fit elements 16, 18a is here oriented at least substantially in an actuation direction of the corresponding actuating elements 24a, 26a. Both the actuating elements 24a, 26a and the form-fit elements 16a, 18a of the adapter 10a formed as the wiper arm adapter are deflected in the direction of a centre plane of the adapter 10a. In principle however it is also conceivable that the actuating elements 24a, 26a are deflected by a tool provided for this, for example pliers or another tool appearing suitable to the person skilled in the art.

To prevent a rotation of the adapters 10a, 14a in relation to each other, the adapter 10a has two further form-fit elements 30a, 32a. The further form-fit elements 30a, 32a are provided to transmit a substantial part of a wiping force. For this the further form-fit elements 30a, 32a are formed as protrusions. The form-fit elements 30a, 32a have an oval base form, whereby a wiping force of the wiper arm can be transmitted particularly well by the adapters 10a, 14a. The form-fit elements formed as protrusions 30a, 32a are arranged on a lower contact face 56a of the adapter 10a. One of the form-fit elements 30a, 32a is arranged along the horizontal axis in an outer region of the adapter 10a. The form-fit elements 30a, 32a each have the same distance from the centre plane of the adapter 10a. A form fit which can be created via the form-fit elements 30a, 32a is open in one direction along the vertical axis 28a. In this direction the adapters 10a, 14a are also separated from each other. The form-fit elements 16a, 18a connect the adapters 10a, 14a captively together and thus also hold in form fit and fix the form-fit elements 30a, 32a which are provided for substantial transmission of the wiper force.

To link the form-fit elements 16a, 18a formed as catch elements, the adapter 14a formed as a wiper blade adapter has two form-fit elements 20a, 22a corresponding to the form-fit elements 16a, 18a. The form-fit elements 20a, 22a of the further adapter 14a are formed corresponding to the form-fit elements 16a, 18a of the adapter 10a and provided for form fit therewith. The form-fit elements 20a, 22a are formed as recesses let into the base body 36a of the adapter 14a. Each of the form-fit elements 20a, 22a of the adapter 14a has an undercut 62a, 64a. In mounted state, the form-fit element 16a, 18a of the adapter 10a formed correspondingly as a catch element engages in the respective undercut 62a, 64a. In mounted state, the form-fit elements 20a, 22a, formed as recesses, with their undercuts 62a, 64a each create a form-fit connection acting in the axial direction with the corresponding form-fit element 16a, 18a, formed as a catch element, of the adapter 10a.

The further adapter 14a has two further form-fit elements 66a, 68a for coupling with the further form-fit elements 30a, 32a of the adapter 10a. The form-fit elements 66a, 68a are formed corresponding to the further form-fit elements 30a, 32a of the adapter 10a. The form-fit elements 66a, 68a are formed as recesses which have an oval base shape. The form-fit elements 66a, 68a formed as recesses are let into the support surface 56a of the base body 42a. In mounted state, the form-fit elements 30a, 32a, formed as protrusions, of the adapter 10a formed as a wiper arm adapter are arranged in the form-fit elements 66a, 68a, formed as recesses, of the adapter 14a formed as the wiper blade adapter.

In principle here it is also conceivable that the further form-fit elements 30a, 32a of the adapter 10a formed as the wiper arm adapter are formed as recesses, and the form-fit elements 66a, 68a of the adapter 14a formed as the wiper blade adapter are formed as protrusions. In principle it is also conceivable that form-fit elements 30a, 32a, 66a, 68a of an adapter 10a, 14a are formed both as protrusions and recesses.

The system furthermore comprises a spoiler element 70a and a carrier element 72a. The spoiler element 70a, carrier element 72a and wiper blade 12a are arranged on the wiper device. The spoiler element 70a has two symmetrically formed, concave spoiler surfaces 74a which deflect travel wind occurring in the operating state and hence increase the main contact force 40a. Also the spoiler element 70a is formed of two pieces, i.e. from two separate components. The carrier element 72a also comprises two spring rails 76a. In this context however it is also conceivable to use a one-piece spring rail as a carrier element 72a. During mounting, the carrier element 72a is pushed into a longitudinal guide rail of the spoiler element 70a. The wiper blade 12a is thus held on both sides by the spring rail 76a. For this the wiper blade 12a on each side has a receiver groove 78a for the carrier element 72a. Two end caps 80a, 82a terminate the carrier element 72a at each end in the longitudinal direction of the wiper blade 12a and prevent detachment of the spring rail 76a from the receiver groove 78a. The wiper blade 12a in mounted state is thus connected to the spoiler element 70a by the carrier element 72a.

The carrier element 72a has four fixing lugs 84a, 86a. In each case two fixing lugs 84a point in a direction which runs opposite a direction of the other two fixing lugs 86a. The base body 36a of the further adapter 14a formed as the wiper blade adapter has four fixing recesses 88a which correspond in shape to the fixing lugs 84a, 86a. To assemble the further adapter 14a formed as a wiper blade adapter with the carrier element, the fixing lugs 84a, 86a are introduced in the fixing recesses 88a. Furthermore many other fixing methods which appear suitable to the person skilled in the art are conceivable for fixing the carrier element 72a to the further adapter 14a formed as the wiper blade adapter, such as in particular suspending a carrier element in a guide rail of the further adapter 14a formed as the wiper blade adapter. Furthermore the base body 36a could be surrounded by a carrier element. Furthermore it is also conceivable to glue, screw and/or rivet the carrier element 72a to the base body 36a. If the base body 36a of the adapter 14a formed as the wiper blade adapter is made from a metal part, a carrier element can also be attached by welding or soldering.

In principle it is also conceivable that the form-fit elements 16a, 18a formed as catch elements are formed by the further adapter 14a formed as the wiper blade adapter, and that the form-fit elements 20a, 22a formed as recesses are formed by the adapter 10a formed as the wiper arm adapter.

FIGS. 3 to 9 show further exemplary embodiments of the invention. The descriptions and drawings below are substantially restricted to the differences between the exemplary embodiments, wherein in relation to components with the same designation, in particular in relation to components with the same reference numerals, in principle reference can be made to the drawings and/or the description of the other exemplary embodiments, in particular of FIGS. 1 and 2. To distinguish the exemplary embodiments, the letter a is added after the reference numeral of the exemplary embodiment in FIGS. 1 and 2. In the exemplary embodiments of FIGS. 3 to 9, the letter a is replaced by the letters b to h.

Figure 3:
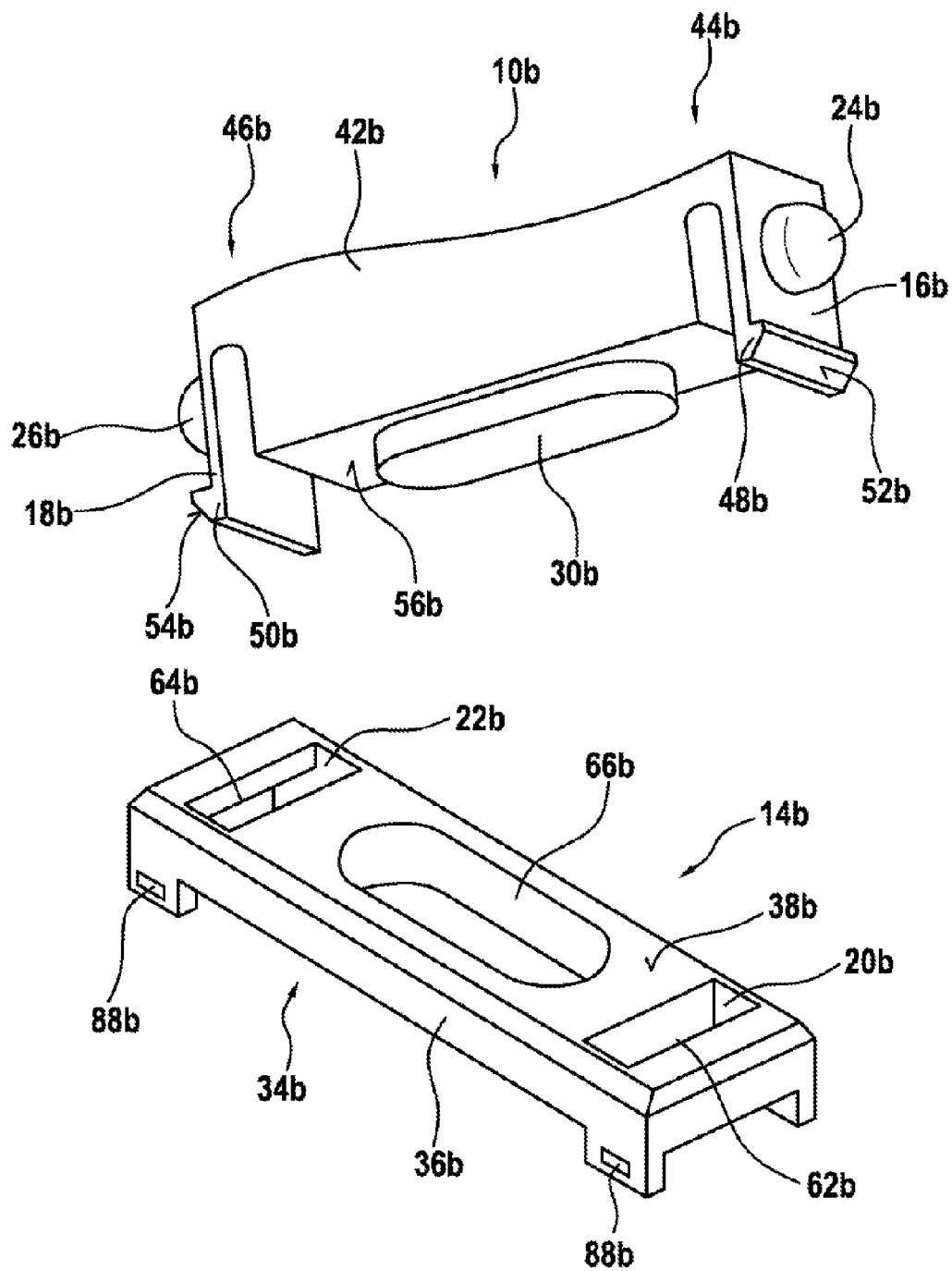
FIG. 3 a perspective view of the system with the wiper device in a second exemplary embodiment.

FIG. 3 shows a system according to the invention with a wiper device and a further adapter 14b in the second exemplary embodiment. The wiper device comprises an adapter 10b which has a pivot point (not shown in more detail) to a wiper arm. The design of form-fit elements 16b, 18b, 20b, 22b of the adapter 10b and the further adapter 14b which are provided for form-fit connection in an axial direction, and of actuating elements 24b, 26b, is identical to those of the previous exemplary embodiment in FIGS. 1 and 2.

Only the design of the further form-fit elements of adapters 10b, 14b, which are provided to prevent a rotation of the adapters 10b, 14b in relation to each other, differs from the previous exemplary embodiment. The adapter 10b formed as the wiper arm adapter has only one form-fit element 30b formed as a protrusion. The form-fit element 30b formed as a protrusion has an oval base shape. The form-fit element 30b extends over a large part of the lower contact surface 56b of the one base body 42b of the adapter 10b. A form-fit element 32b is here arranged symmetrically to a centre plane of the adapter. The further adapter 14b has a further form-fit element 66b corresponding to the further form-fit element 32b. The further form-fit element 66b of the adapter 14b is formed as a recess and has an oval base shape like that of the form-fit element 32b of the adapter 10b.

Figure 4:
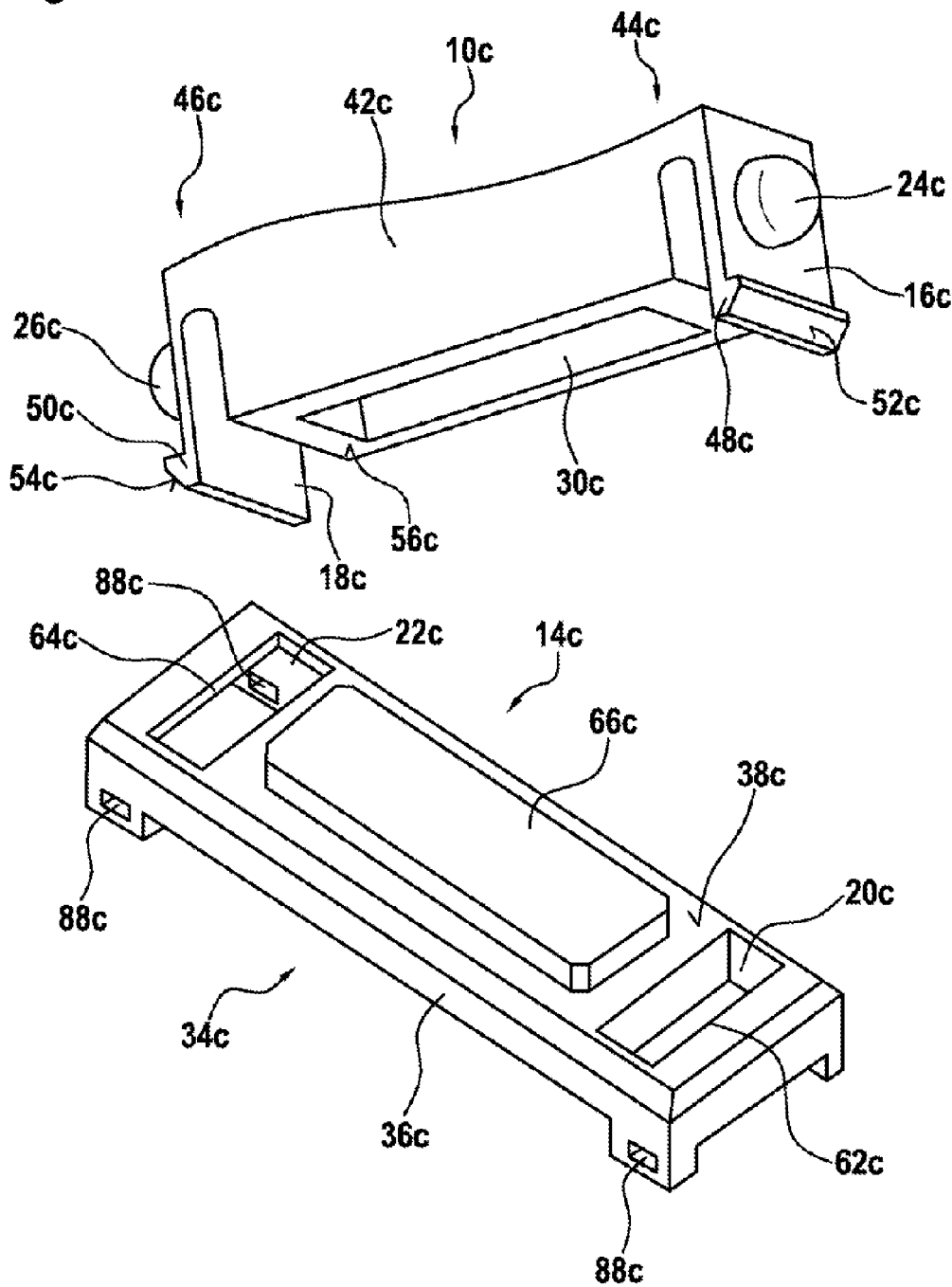
FIG. 4 a perspective view of the system with the wiper device in a third exemplary embodiment.

FIG. 4 shows a system according to the invention with a wiper device and a further adapter 14c in the third exemplary embodiment. The wiper device comprises an adapter 10c which has a pivot point (not shown in more detail) to a wiper arm. The design of form-fit elements 16c, 18c, 20c, 22c of the adapter 10c and the further adapter 14c which are provided for form-fit connection in an axial direction, and of actuating elements 24c, 26c, is identical to those of the first exemplary embodiment in FIGS. 1 and 2. In the same way as the second exemplary embodiment from FIG. 3, the adapter 10c has only one further form-fit element 32c. In contrast to the previous exemplary embodiment, this form-fit element 32c has a rectangular base shape. Furthermore here the form-fit element 32c of the adapter 10c formed as the wiper arm adapter is formed as a recess. A corresponding form-fit element 66c of the adapter 14c formed as a wiper blade adapter is formed as a protrusion.

Figure 5:
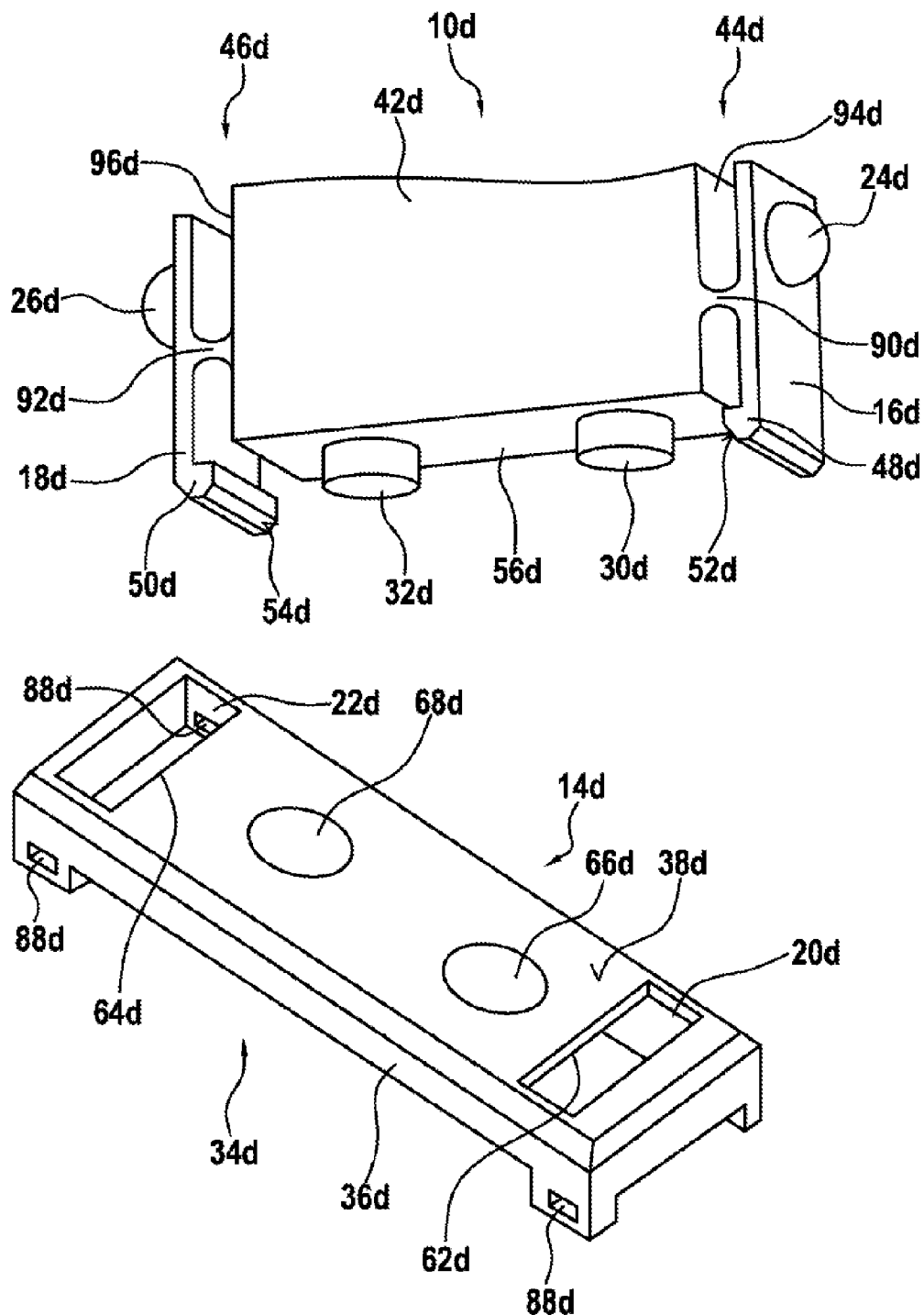
FIG. 5 a perspective view of the system with the wiper device in a fourth exemplary embodiment.

FIG. 5 shows a system according to the invention with a wiper device and a further adapter 14d in a fourth exemplary embodiment. The wiper device comprises an adapter 10d which has a pivot point (not shown in more detail) to a wiper arm. The adapter 10d formed as a wiper arm adapter has a base body 42d which comprises a form-fit element 16d, 18d on two opposing sides. The two form-fit elements 16d, 18d are provided for form-fit connection of the adapter 10d in an axial direction. The form-fit elements 16d, 18d are formed integrally with the base body 42d of the adapter 10d. The form-fit elements 16d, 18d each have a hinge point 90d, 92d via which they are connected to the base body 42d of the adapter 10d. The hinge points 90d, 92d each form a connection between the corresponding form-fit elements 16d, 18d and the base body 42d of the adapter 10d. The hinge point 90d, 92d fixes the form-fit elements 16d, 18d spaced from the outer wall 94d, 96d of the base body 42d of the adapter 10d. Thus the form-fit elements 16d, 18d can be moved and deflected relative to the base body 42d of the adapter 10d via the hinge point 90d, 92d. The hinge points 90d, 92d are arranged approximately in the middle of the adapter 10d in the axial direction. The form-fit elements 16d, 18d protrude in the axial direction on both sides beyond the corresponding hinge point 90d, 92d. Via the hinge point 90d, 92d, a region of the corresponding form-fit element 16d, 18d arranged axially above the hinge point 90d, 92d is deflected in an opposite direction to a region of the corresponding form-fit element 16d, 18d arranged axially below the hinge point 90d, 92d.

The form-fit elements 16d, 18d formed as catch elements have a hook form 48d, 50d on their side facing the further adapter 14d in mounted state. The hook form 48d, 50d is here directed inward i.e. in the direction of a centre plane of the adapter 10d. On their underside, each hook form 48d, 50d forms a deflection chamfer 52d, 54d which is provided to deflect the corresponding form-fit element 16d, 18d by contact with the further adapter 14d during the mounting process. The deflection chamfers 52d, 54d are also oriented in the direction of the centre plane of the adapter 10d, so that during mounting, the form-fit elements 16d, 18d are deflected outward by means of the deflection chamfers 52d, 54d, away from the centre plane of the adapter 10d. A deflection direction of the form-fit elements 16d, 18d formed as catch elements is oriented outward, away from the centre plane of the adapter 10d.

The wiper device comprises two actuating elements 24d, 26d which are provided to be deflected manually in order to deflect the form-fit elements 16d, 18d of the adapter 10d on dismantling. The actuating elements 24d, 26d are formed as protrusions on an outside of the form-fit elements 16d, 18d. The actuating elements 24d, 26d are formed integrally with the form-fit elements 16d, 18d. The actuating elements 24d, 26d are each arranged in a region of the corresponding form-fit elements 16d, 18d facing away from the further adapter 14d in mounted state, above the corresponding hinge point 90d, 92d. An actuation direction in which the user actuates the actuating elements 24d, 26d manually is oriented in the direction of the centre plane of the adapter 10d.

On dismantling, the form-fit elements 16d, 18d are deflected by means of the actuating elements 24d, 26d. A user here, for example by his hand, exerts a deflection force on the form-fit elements of the adapter 10d via the actuating elements 24d, 26d. The deflection direction of the form-fit elements 16d, 18d is oriented at least substantially opposite the actuation direction of the corresponding actuating element 24d, 26d.

The further adapter 14d is formed substantially the same as in the former exemplary embodiments. Only the form-fit elements 20d, 22d which are provided for form-fit connection with the form-fit elements 16d, 18d, formed as catch elements, are adapted to the reversed shape of the hook forms 48d, 50d of the form-fit elements 16d, 18d of the adapter 10d, and have their undercut 62d, 64d on a side of the corresponding form-fit element 20d, 22d facing the centre plane of the adapter 10d.

Figure 6:
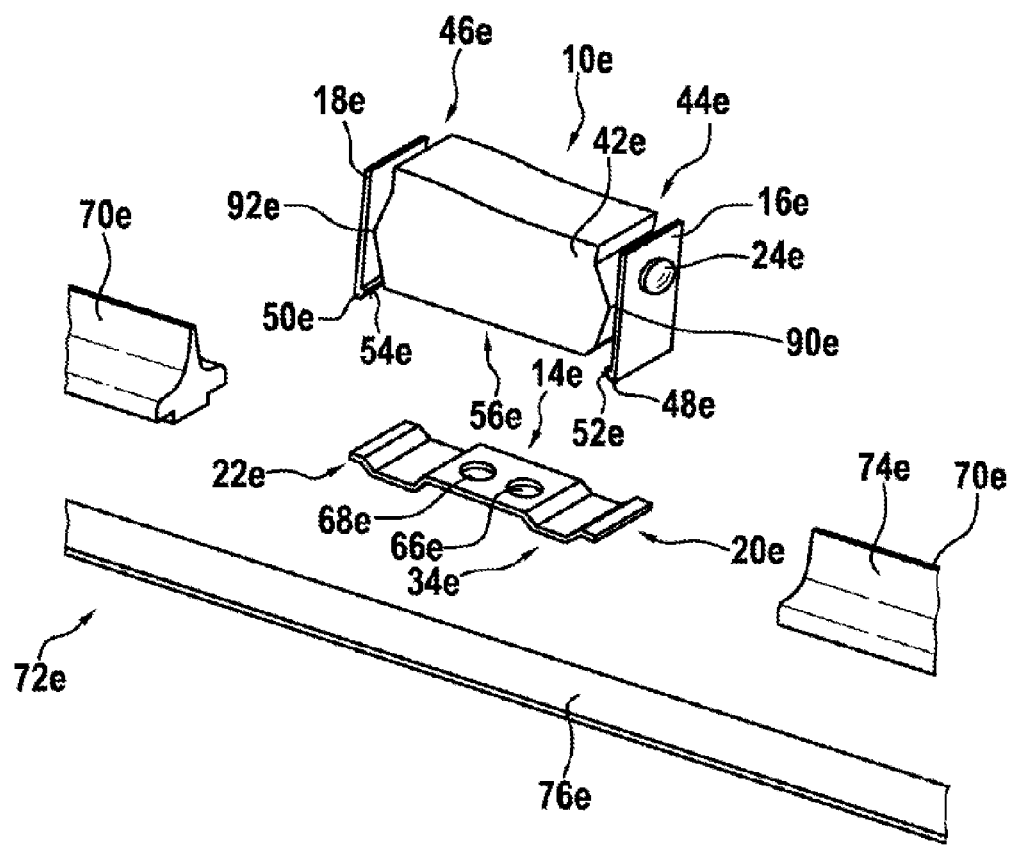
FIG. 6 a perspective view of the system with the wiper device in a fifth exemplary embodiment.

FIG. 6 shows a system according to the invention with a wiper device and a further adapter 14e in a fifth exemplary embodiment. The wiper device comprises an adapter 10e which has a pivot point (not shown in more detail) to a wiper arm. The design of the form-fit elements 16e, 18e of the adapter 10e and the actuating elements 24e, 26e is identical to that of the previous exemplary embodiment from FIG. 5. In contrast to the previous exemplary embodiment, the further adapter 14e is made from a curved metal sheet. The further adapter 14e is here permanently connected to a spring rail 76e of the system, for example by means of a welding process or in another manner appearing suitable to the person skilled in the art. Here the spring rail 76e formed as a carrier element 72e is formed as an unslotted spring rail. Two form-fit elements 20e, 22e of the further adapter 14e formed corresponding to the form-fit elements 16e, 18e of adapter 10e, formed as catch elements, are formed such that the adapter 14e made from the curved metal sheet has a shoulder, which is bent in the direction of the adapter 10e, on its ends standing orthogonal to the horizontal axis. The form-fit elements 16e, 18e formed as catch elements can engage under these shoulders for form fit with the corresponding form-fit elements 22e, 24e of the further adapter 14e.

Figure 7:
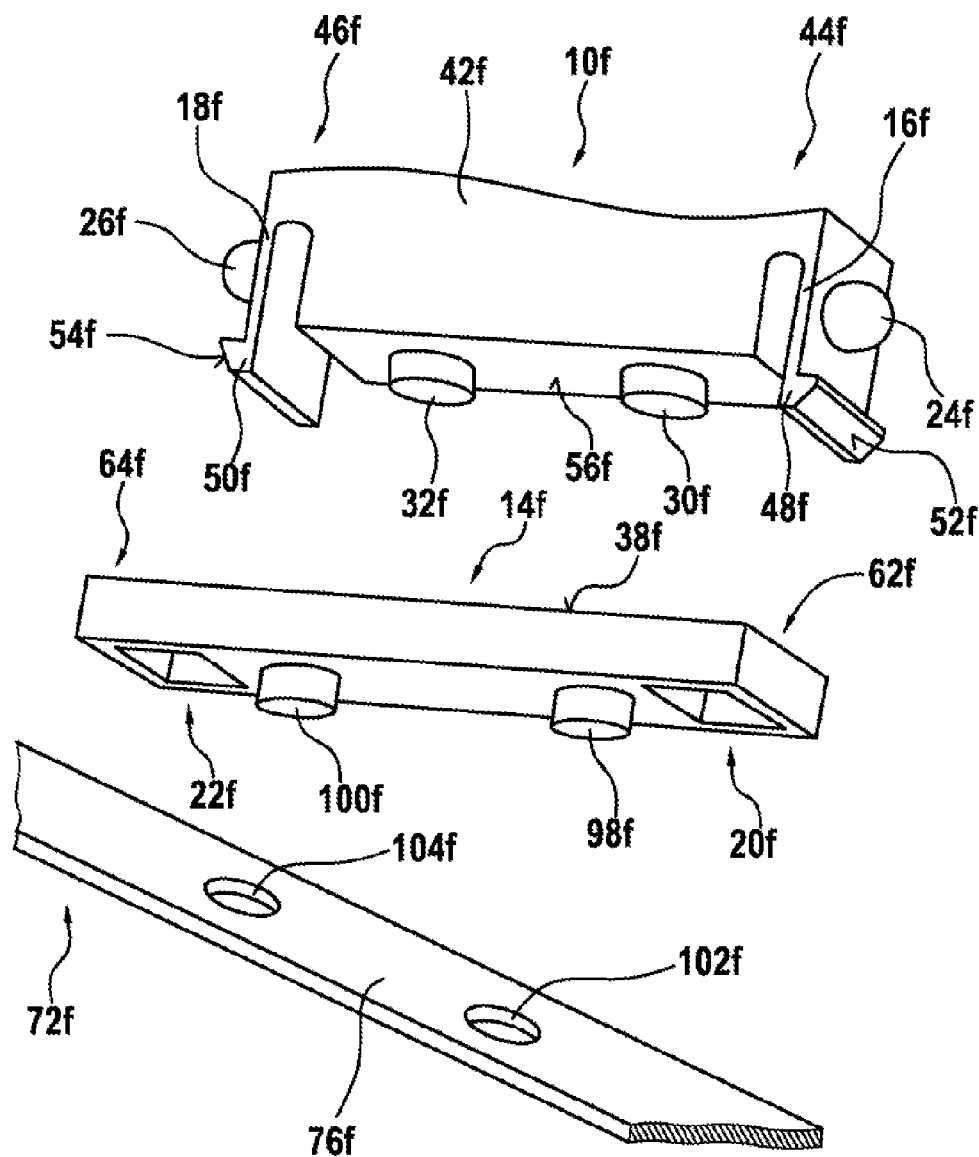
FIG. 7 a perspective view of the system with the wiper device in a sixth exemplary embodiment.

FIG. 7 shows a system according to the invention with a wiper device and a further adapter 14f in a sixth exemplary embodiment. The wiper device comprises an adapter 10f which has a pivot point (not shown in more detail) to a wiper arm. A design of form-fit elements 16f, 18f, 20f, 22f of the adapter 10f and further adapter 14f, which are provided for form-fit connection in an axial direction, and of actuating elements 24f, 26f, is identical to that of the first exemplary embodiment from FIG. 1. In contrast, the further adapter 14d for connection with an unslotted spring rail 76f has two protrusions 98f, 100f on its side facing away from the adapter 10f in mounted state, by means of which protrusions the further adapter 14f is inseparably connected to the spring rail 76f via a hot stamping process. For this the spring rail 76f has two receivers 102f, 104f in which the protrusions 98f, 100f of the further adapter 14f are introduced in order to connect the adapter 14f to the spring rail 76f.

Figure 8:
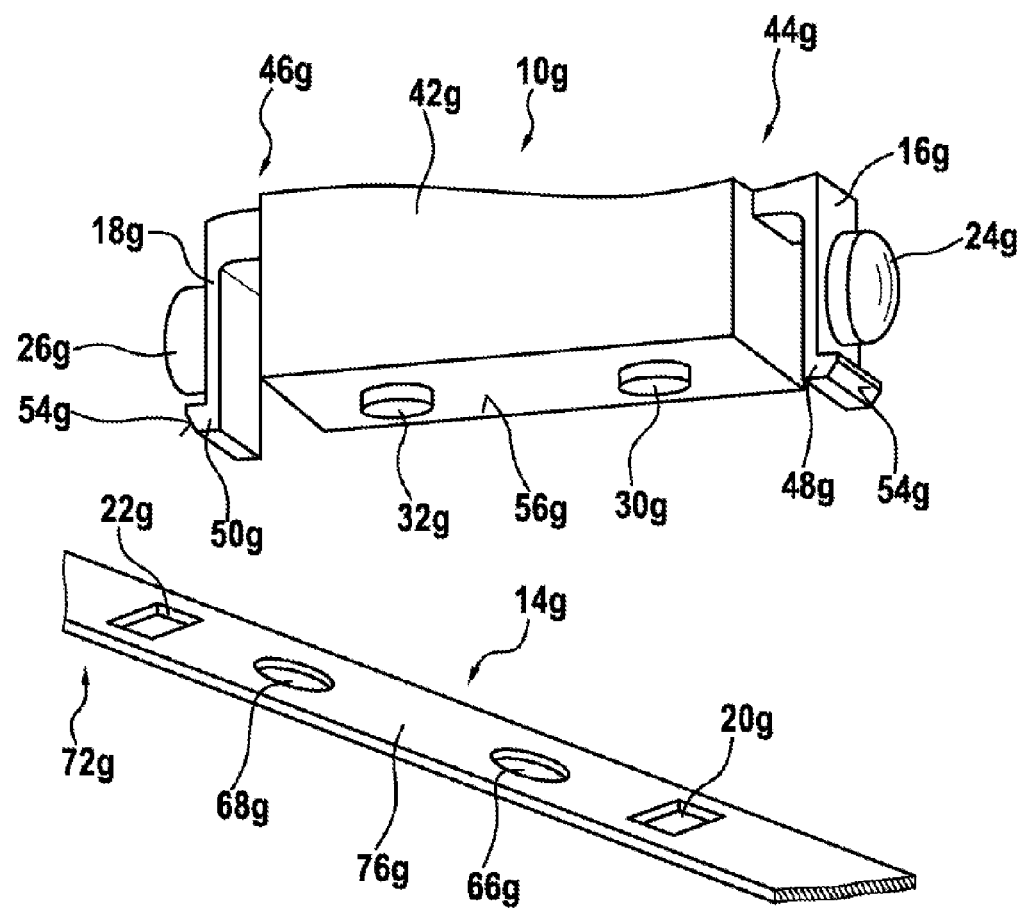
FIG. 8 a perspective view of the system with the wiper device in a seventh exemplary embodiment.

FIG. 8 shows a system according to the invention with a wiper device and a further adapter 14g in a seventh exemplary embodiment. The wiper device comprises an adapter 10g which has a pivot point (not shown in more detail) to a wiper arm. A design of form-fit elements 16g, 18g and further form-fit elements 30g, 32g of adapter 10g, and of actuating elements 24g, 26g, is identical to that of the first exemplary embodiment from FIG. 1. In contrast, the further adapter 14g is formed as a spring rail 76g. The spring rail 76g formed as the further adapter 14g is formed as an unslotted spring rail. Form-fit elements 20g, 22g and further form-fit elements 66g, 68g corresponding to form-fit elements 16f, 18g, 30g, 32g of adapter 10g are produced as recesses in the unslotted spring rail 76g. In contrast to the former exemplary embodiment however, here the form-fit elements 16g, 18g of the adapter 10g formed as catch elements are designed more massive, i.e. for example with thicker walls, since in this exemplary embodiment they must transmit greater forces because the further form-fit elements 30g, 32g, 66g, 68g of the adapters 10g, 14g can transmit smaller forces due to the low height provided by the rail 76g for force transmission.

Figure 9:
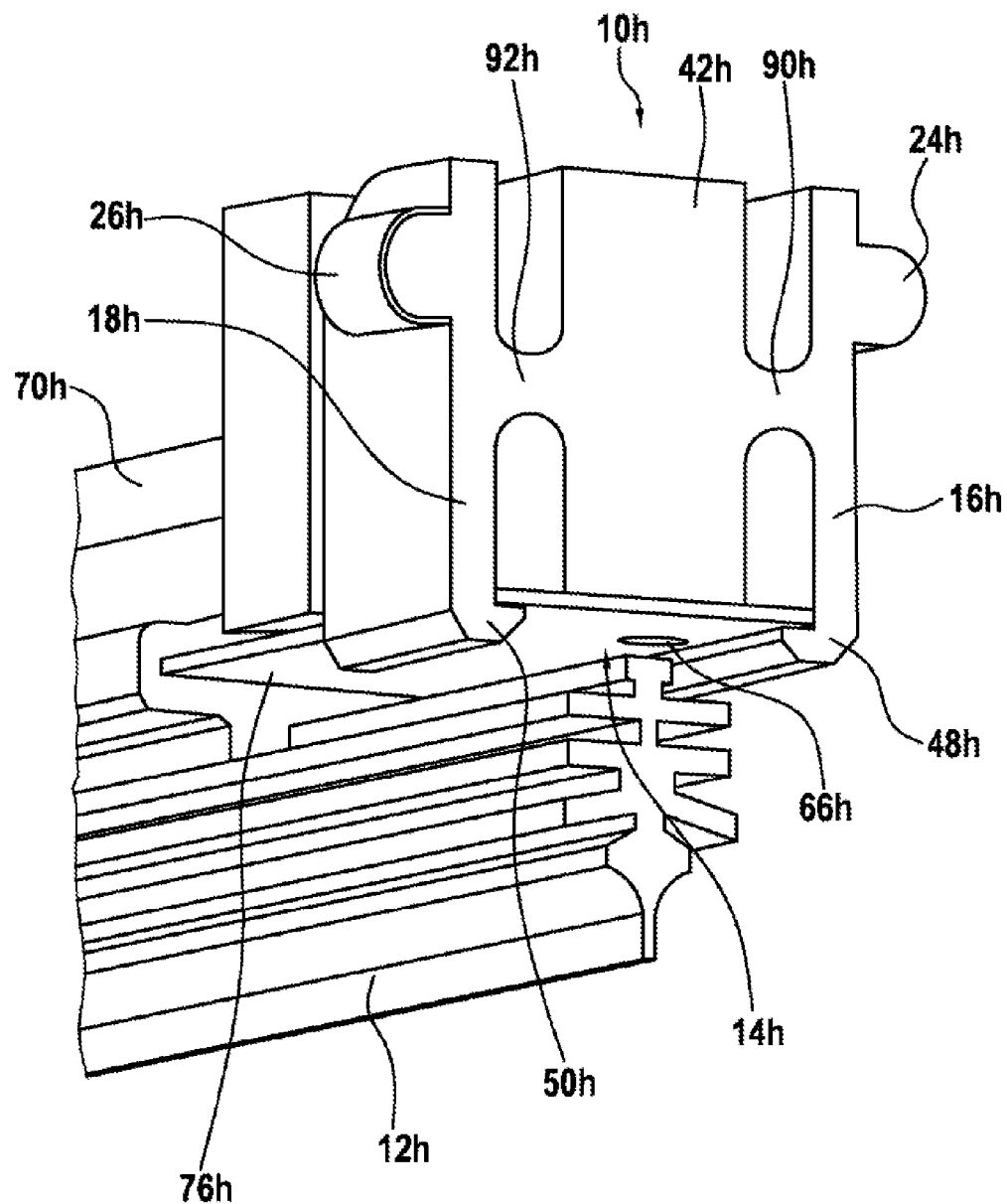
FIG. 9 a perspective view of the system with the wiper device in an eighth exemplary embodiment.

FIG. 9 shows a system according to the invention with a wiper device and a further adapter 14h in an eighth exemplary embodiment. The wiper device comprises an adapter 10h which has a pivot point (not shown in more detail) to a wiper arm. The further adapter 14h, as in the previous exemplary embodiment from FIG. 8, is formed as a spring rail 76h. The adapter 10 has two form-fit elements 16h, 18h formed as catch elements. In contrast to the previous embodiment, the form-fit elements 16h, 18h of the adapter 10h are arranged on ends of the adapter 10h running parallel to the horizontal axis. The form-fit elements 16h, 18h are oriented parallel to the horizontal axis. A deflection direction of the form-fit elements 16h, 18h here stands perpendicular to the horizontal axis. A fundamental design of the form-fit elements 16h, 18h formed as catch elements is substantially identical to the design of the corresponding form-fit elements formed as catch elements from the fourth exemplary embodiment from FIG. 5 or from the seventh exemplary embodiment from FIG. 8.

Further form-fit elements 30h of adapter 10h formed as protrusions are in principle designed in the same way as in the first exemplary embodiment from FIG. 1. In mounted state they engage in corresponding further form-fit elements 66h which are produced as recesses in the adapter 14h formed as a spring rail 76h. For form-fit connection in an axial direction, the form-fit elements 16h, 18h formed as catch elements engage in the spring rail 76h. The form-fit elements 16h, 18h with their hook forms 48h, 50h engage laterally below the spring rail 76h, orthogonal to the horizontal axis, and thus form a form-fit connection in the axial direction.

In principle it is conceivable that the various designs, described in the exemplary embodiments, of the form-fit elements formed as catch elements, the form-fit elements formed as recesses, the further form-fit elements formed as protrusions and/or the connections of the further adapter on a carrier element or spring rail, can be combined in various ways appearing suitable to the person skilled in the art.

What is claimed is:

1. A wiper device with a first adapter (10a; 10b; 10c; 10d; 10e; 10f; 10g; 10h) which forms a pivot point to a wiper arm or wiper blade (12a; 12e; 12h) and has at least one form-fit element (16a, 18a; 16b, 18b; 16c, 18c; 16d, 18d; 16e, 18e; 16f, 18f; 16g, 18g; 16h, 18h) configured for translational mounting in an axial direction with a second adapter (14a; 14b; 14c; 14d; 14e; 14f; 14g; 14h) and for form-fit connection in the axial direction with at least one form-fit element (20a, 22a; 20b, 22b; 20c, 22c; 20d, 22d; 20e, 22e; 20f, 22f; 20g, 22g; 20h, 22h) of the second adapter (14a; 14b; 14c; 14d; 14e; 14f; 14g; 14h), wherein the form-fit element of the first adapter deflects during the translational mounting, and the first and second adapters are engaged together after the translational mounting, wherein the axial direction runs parallel to a vertical axis, characterized by at least one actuating element (24a, 26a; 24b, 26b; 24c, 26c; 24d, 26d; 24e, 26e; 24f, 26f; 24g, 26g; 24h, 26h) configured to be pressed by hand in order to deflect the at least one form-fit element of the first adapter and to disengage the first adapter from the second adapter, wherein the first adapter has at least one further form-fit element (30a, 32a; 30b, 32b; 30c, 32c; 30d, 32d; 30e, 32e; 30f, 32f; 30g, 32g; 30h, 32h) which is formed as an elevation or a recess, and which is configured for form-fit connection with the second adapter (14a; 14b; 14c; 14d; 14e; 14f; 14g; 14h) during the translational mounting in order to prevent a rotation of the first and second adapters (10a, 14a; 10b, 14b; 10c, 14c; 10d, 14d; 10e, 14e; 10f, 14f; 10g, 14g; 10h, 14h) in relation to each other.

2. The wiper device as claimed in claim 1, characterized in that the at least one actuating element (24a, 26a; 24b, 26b; 24c, 26c; 24d, 26d; 24e, 26e; 24f, 26f; 24g, 26g; 24h, 26h) is formed as a manual actuating element and is configured to be deflected manually.

3. The wiper device as claimed in claim 2, characterized in that the first adapter (10a; 10b; 10c; 10d; 10e; 10f; 10g; 10h) is formed as a wiper arm adapter.

4. The wiper device as claimed in claim 3, characterized in that at least one form-fit element (16a, 18a; 16b, 18b; 16c, 18c; 16d, 18d; 16e, 18e; 16f, 18f; 16g, 18g; 16h, 18h) of the first adapter (10a; 10b; 10c; 10d; 10e; 10f; 10g; 10h) is arranged on an outside (46a) of the first adapter (10a; 10b; 10c; 10d; 10e; 10f; 10g; 10h).

5. The wiper device as claimed in claim 4, characterized in that at least one form-fit element (16a, 18a; 16b, 18b; 16c, 18c; 16d, 18d; 16e, 18e; 16f, 18f; 16g, 18g; 16h, 18h) of the first adapter (10a; 10b; 10c; 10d; 10e; 10f; 10g; 10h) is formed as a catch element which is configured to be deflected during mounting.

6. The wiper device as claimed in claim 5, characterized in that the at least one form-fit element (16a, 18a; 16b, 18b; 16c, 18c; 16f, 18f; 16g, 18g) of the first adapter (10a; 10b; 10c; 10d; 10e; 10f; 10g; 10h) has a deflection direction which is oriented at least substantially in an actuation direction of the at least one actuating element (24a, 26b; 24b, 26b; 24c, 26c; 24f, 26f; 24g, 26g).

7. The wiper device as claimed in claim 6, characterized in that the at least one form-fit element (16d, 18d; 16e, 18e; 16h, 18h) of the first adapter (10a; 10b; 10c; 10d; 10e; 10f; 10g; 10h) formed as a catch element has a deflection direction which runs at least substantially opposite an actuation direction of the at least one actuating element (24d, 26d; 24e, 26e; 24h, 26h).

8. The wiper device as claimed in claim 1, characterized in that the first adapter (10a; 10b; 10c; 10d; 10e; 10f; 10g; 10h) is formed as a wiper arm adapter.

9. The wiper device as claimed in claim 1, characterized in that the at least one form-fit element (16a, 18a; 16b, 18b; 16c, 18c; 16d, 18d; 16e, 18e; 16f, 18f; 16g, 18g; 16h, 18h) of the first adapter (10a; 10b; 10c; 10d; 10e; 10f; 10g; 10h) is arranged on an outside (46a) of the first adapter (10a; 10b; 10c; 10d; 10e; 10f; 10g; 10h).

10. The wiper device as claimed in claim 1, characterized in that the at least one form-fit element (16a, 18a; 16b, 18b; 16c, 18c; 16d, 18d; 16e, 18e; 16f, 18f; 16g, 18g; 16h, 18h) of the first adapter (10a; 10b; 10c; 10d; 10e; 10f; 10g; 10h) is formed as a catch element which is configured to be deflected during mounting.

11. The wiper device as claimed in claim 10, characterized in that the at least one form-fit element (16d, 18d; 16e, 18e; 16h, 18h) of the first adapter (10a; 10b; 10c; 10d; 10e; 10f; 10g; 10h) formed as a catch element has a deflection direction which runs at least substantially opposite an actuation direction of the at least one actuating element (24d, 26d; 24e, 26e; 24h, 26h).

12. The wiper device as claimed in claim 1, characterized in that the at least one form-fit element (16a, 18a; 16b, 18b; 16c, 18c; 16f, 18f; 16g, 18g) of the first adapter (10a; 10b; 10c; 10d; 10e; 10f; 10g; 10h) has a deflection direction which is oriented at least substantially in an actuation direction of the at least one actuating element (24a, 26b; 24b, 26b; 24c, 26c; 24f, 26f; 24g, 26g).

13. A system with a wiper device as claimed in claim 1 and the second adapter (14a; 14b; 14c; 14d; 14e; 14f; 14g; 14h), characterized in that the second adapter (14a; 14b; 14c; 14d; 14e; 14f; 14g; 14h) is formed as a wiper blade adapter.

14. A system with a wiper device as claimed in claim 1 and the second adapter (14a; 14b; 14c; 14d; 14e; 14f; 14g; 14h), characterized in that the second adapter (14g; 14h) is formed as a spring rail (76g; 76h).

15. The wiper device as claimed in claim 1, wherein the further form-fit element is formed as an elevation.

16. The wiper device as claimed in claim 15, wherein the elevation is a cylindrical protrusion, wherein the cylindrical protrusion extends vertically parallel to the vertical axis.

17. The wiper device as claimed in claim 1, wherein the further form-fit element is formed as a recess.

18. The wiper device as claimed in claim 1, wherein the at least one actuating element, upon being pressed, is configured to pivot the at least one form-fit element of the first adapter toward the further form-fit element.

19. The wiper device as claimed in claim 1, wherein the at least one actuating element (24a, 26a; 24b, 26b; 24c, 26c; 24d, 26d; 24e, 26e; 24f, 26f; 24g, 26g; 24h, 26h) includes a first actuating element (24a; 24b; 24c; 24d; 24e; 24f; 24g; 24h; 24h) and a second actuating element (26a; 26b; 26c; 26d; 26e; 26f; 26g; 26h; 26h) disposed opposite the first actuating element along a longitudinal axis, wherein the second actuating element is on a second form-fit element (18a; 18b; 18c; 18d; 18e; 18f; 18g; 18h) on the first adapter, wherein the first and second actuating elements are configured to be pressed toward one another along the longitudinal axis to disengage the first adapter from the second adapter.

20. The wiper device as claimed in claim 1, wherein the at least one form-fit element of the first adapter includes a flexible tongue having a hook form (48a).

21. The wiper device as claimed in claim 1, wherein the at least one form-fit element of the first adapter is a catch element that deflects during the translational mounting, and wherein the first and second adapters are engaged together during the translational mounting via a snap-fit engagement.

22. The wiper device as claimed in claim 1, wherein the at least one form-fit element prevents the rotation about a vertical axis, wherein the vertical axis defines the axial direction.

* * * * *